United States Patent
Zeigler et al.

(10) Patent No.: US 8,311,926 B1
(45) Date of Patent: *Nov. 13, 2012

(54) MONTAGE FOR AUTOMATED MARKET SYSTEM

(75) Inventors: Abraham I. Zeigler, Foster City, CA (US); Richard G. Ketchum, Alexandria, VA (US); Alfred R. Berkeley, III, Baltimore, MD (US)

(73) Assignee: The NASDAQ OMX Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,875

(22) Filed: Sep. 23, 1999

(51) Int. Cl.
*G06Q 40/00* (2012.01)
(52) U.S. Cl. .......................... 705/37; 705/36 R; 705/35
(58) Field of Classification Search .............. 705/35–39
See application file for complete search history.

(56) References Cited

U.S. PATENT DOCUMENTS

| | | | | |
|---|---|---|---|---|
| 4,674,044 A | * | 6/1987 | Kalmus et al. | 705/37 |
| 5,297,031 A | | 3/1994 | Gutterman et al. | |
| 5,297,032 A | | 3/1994 | Trojan et al. | 364/408 |
| 5,774,879 A | * | 6/1998 | Custy et al. | 705/35 |
| 5,787,402 A | * | 7/1998 | Potter et al. | 705/37 |
| 5,918,216 A | * | 6/1999 | Miksovsky et al. | 705/35 |
| 5,920,848 A | * | 7/1999 | Schutzer et al. | 705/42 |
| 6,195,647 B1 | | 2/2001 | Martyn et al. | |
| 6,272,474 B1 | | 8/2001 | Garcia | |
| 6,278,982 B1 | | 8/2001 | Korhammer et al. | |

FOREIGN PATENT DOCUMENTS

| | | |
|---|---|---|
| WO | WO 91 14231 | 9/1991 |
| WO | WO 98/13778 | 4/1998 |

OTHER PUBLICATIONS

Anonymous "Database Info Accessible Via Telephone ( Syntellect debuts new database voice retrieval system )" Sep. 28, 1994 Newsbytes News Network, p N/A.*
Anonymous "Corporate Profile for Fundtech, dated Aug. 23, 1996." Aug. 23, 1996 Business Wire, p. 8231006.*
Securities and Exchange Commission, Proposed Rule Change, NASD, Inc., Feb. 5, 1999, 61 pps.
"Nasdaq Workstation II", Nasdaq Stock Market, XP002171886, May 1999, pp. 1-17 (www.nasdaqtrader.com/trader/tradingservices/productservices/userguides/userguides.stm).
"Self Regulatory Organizations: Notice of Filing of Proposed Rule Change by the National Association of Securities Dealers, Inc." Federal Register—Securities and Exchange Commission, vol. 64, No. 47, Mar. 11, 1999, pp. 12198-12202, XP002171885 (198.17.75.65/fril/).

(Continued)

*Primary Examiner* — Kelly Campen
(74) *Attorney, Agent, or Firm* — Nixon & Vanderhye P.C.

(57) ABSTRACT

A graphical user interface for an electronic market for trading products includes an aggregation window which displays additional aggregate quotes for a plurality of price levels of a product traded in the market. A trading system includes client station for entering quotes for securities. The clients have graphical user interfaces at which quotes can be entered and displayed at multiple price levels. The system handles a quote size that is displayable and attributable to a specific market participant, a reserve quote size that is neither displayable nor attributable to a specific market participant, and an additional aggregate quote size that is displayable but not attributable to a specific market participant.

23 Claims, 8 Drawing Sheets

OTHER PUBLICATIONS

"Self Regulatory Organizations: Notice of Filing of Proposed Rule Change by the National Association of Securities Dealers, Inc." Federal Register—Securities and Exchange Commission, vol. 64, No. 77, Apr. 22, 1999, pp. 19844-19849, XP002171896 (198.17.75.65/fril/).

Reich, Benny and Ben-Shaul, Israel: "A Componentized Architecture for Dynamic Electronic Markets", Sigmod Record, vol. 27, No. 4, Dec. 1998, pp. 40-47, XP002171887 (www.acm.org).

* cited by examiner

MONTAGE FOR AUTOMATED MARKET SYSTEM

BACKGROUND

This invention relates to order entry and display in electronic markets.

One example of an electronic market is The Nasdaq Stock Market$^{SM}$. The Nasdaq Stock Market$^{SM}$ uses multiple entities referred to as market makers that are independent dealers that compete for investors' orders. The Nasdaq market is an example of an electronic trading market. Another example of an electronic trading system is the OptiMark$^{SM}$ system (OptiMark Technologies, Inc.). In addition, changes in order handling rules have required market makers to display limit orders from electronic communication networks.

SUMMARY

According to an aspect of the invention, a method of trading securities includes receiving additional aggregate size quotes for a security.

According to an additional aspect of the invention, an electronic market for trading of securities includes a plurality of client stations for entering quotes for securities and a server process that receives quotes from the clients, aggregates quotes and causes aggregate quotes for a plurality of price levels to be displayed on the client systems.

According to an additional aspect of the invention, a client station for entering quotes for securities includes a graphical user interface on the client at which quotes can be entered at a price level. The interface comprises controls to enter a quote size that is displayable and attributable to a specific market participant, a reserve quote size that is neither displayable nor attributable to a specific market participant, and an additional aggregate quote size that is displayable but not attributable to a specific market participant.

According to an additional aspect of the invention, a graphical user interface for an electronic market for trading products includes an aggregation window which displays additional aggregate quotes for a plurality of price levels of a product traded in the market.

One or more of the following advantages may be provided by one or more aspects of the present invention.

The execution system improves market transparency and reduces market fragmentation that can occur with multiple, competing, market centers. The execution system can enhance the collection, aggregation and display of pre-trade information enabling fast, efficient, low-cost access to liquidity. The execution system combines the strengths of a dealer market and an agency market while enabling any alternative market venue to link into the execution system. The execution system aggregates pre-trade information from various market venues and displays the information in a manner that adds depth to the market place. It also preserves the ability for market makers to advertise quotes to promote negotiated transactions. At the same time, the execution system does not invoke global time priority and prohibit market participants from interacting with their own orders and internalizing order flow away from the market center. The execution system thus enhances collection of pre-trade information, aggregation of pre-trade information, display of pre-trade information, and improves access to liquidity through execution systems.

The graphical user interface allows for display of multiple price levels for various types of trading interest. It presents depth to the market and improves market liquidity and transparency while minimizing disclosure of identity of trading interest which should encourage greater quote and order display.

DESCRIPTION

Figure 1:
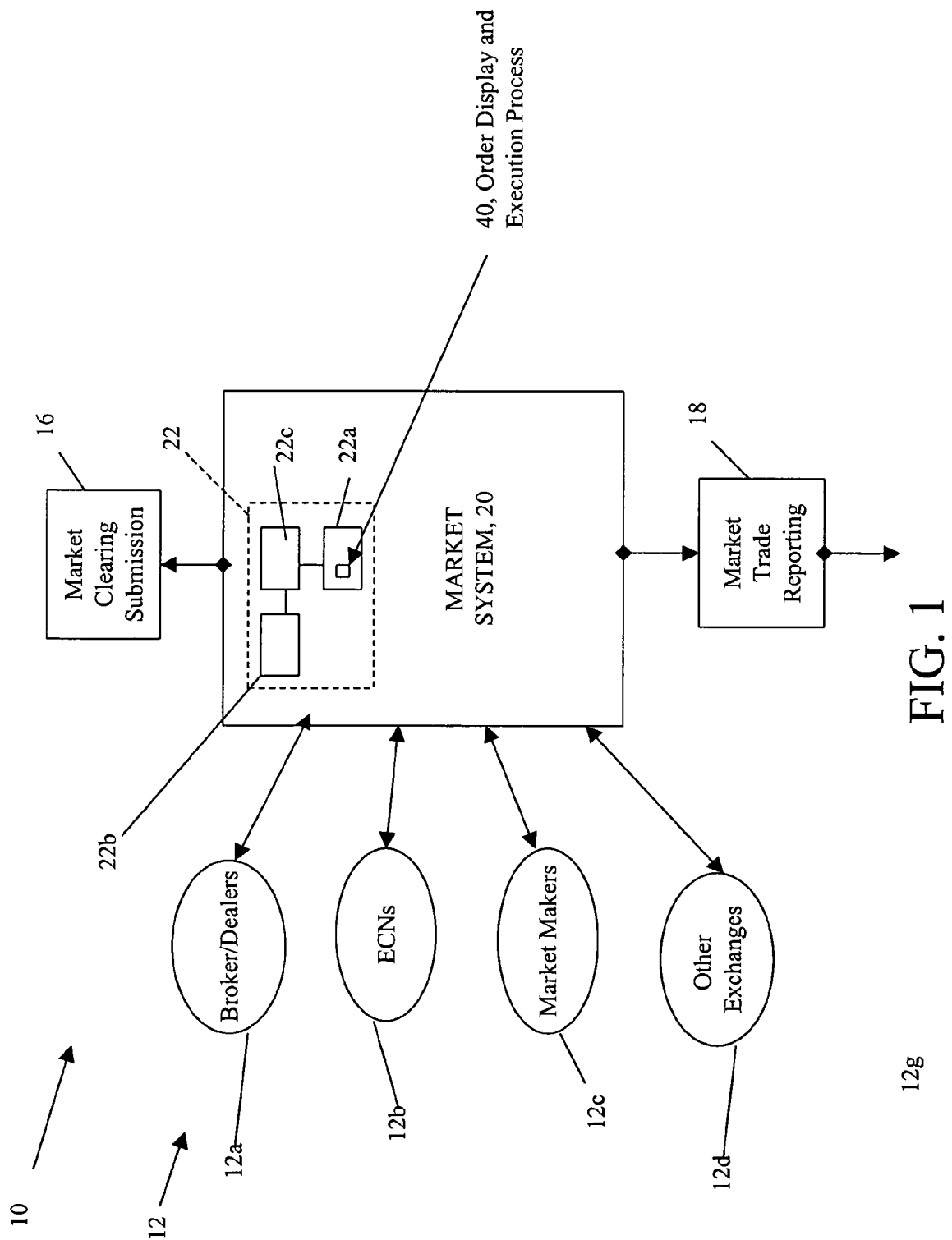
FIG. 1 is a block diagram showing an electronic market.

Referring to FIG. 1, an electronic market 10 is shown. The electronic market includes client systems 12 that access an electronic market system 20. The client systems 12 can be broker/dealer systems 12a, electronic communication networks (ECN's) 12b, market-marker systems 12c, and a connection with other exchanges 12d. The connections can use existing protocols such as SelectNet® for negotiation and the Small Order Execution System™ (SOES™) of Nasdaq for auto execution or an equivalent order delivery system or systems. The client systems include a processor, memory and a storage device e.g., a client workstation or personal computer that can include a client process to enter quotes/orders into the electronic market system. The electronic market system 20 is also coupled to a clearing system 16 and a reporting system 18. The market system 20 is comprised of one or preferably a plurality of server computers generally denoted as 22 including a processor 22a, main memory 22b and storage 22c. The storage system 22c includes an order display and execution process 40 that is executed in memory 22b. In general, server 22 is a complex computer server, the details of which are not important to an understanding of the present invention.

The process 40 collects pre-trade information, in the form of quotes or orders. The distinction between a quote and an order depends on several factors. For example, a market maker can send a proprietary quote, i.e., a quote that represents its own trading interest or an agency quote that represents interest of a market maker sponsored entity. If one proprietary quote is sent it could be considered one order. If one agency quote is sent it also could be considered one order. If an agency quote reflects an aggregation of more than one agency order, however, the aggregate agency order could be considered a quote. Entry of quotes is limited to registered market makers 12b and ECNs 12c. For any given stock, a registered market maker or ECN may directly enter a non-marketable order into the market system 20 on behalf of its customer, or it may sponsor the direct entry of an order by its customer. All sponsored quotes are sent to the market system 20 under the name of the sponsoring market maker or ECN. Every registered market maker or ECN will be permitted to submit an unlimited number of non-marketable quotes to the market system 20.

Quotes submitted to the system can include a quote size, additional aggregate size and a reserve size. Quotes can also include an indication of a willingness to negotiate further. Quote Size is directly attributable to the market maker or ECN when displayed in an "advertisement" section of an order display window 70 to be discussed below. Additional aggregate size is size (in addition to Quote Size) that the market maker or ECN wishes to display to the marketplace through an aggregate display in a top-half of the order display window 70. This size is not attributable to the market maker or ECN until it is executed. Reserve size is size that is never displayed to the marketplace but that is immediately accessible through the order display window 70. In order to utilize Reserve Size, a market maker can be required to have a minimum amount displayed in the aggregate of quote size and aggregate size. A quote size is a displayable quote that can require an order to be delivered for negotiation before moving on to the next price level.

A broker/dealer can receive an order from a customer. The broker/dealer can send that order to the exchange system to be executed with quotes that are posted by electronic communication networks, market makers or other markets. In this embodiment, the broker/dealer does not have the capability of posting quotes.

Figure 2:
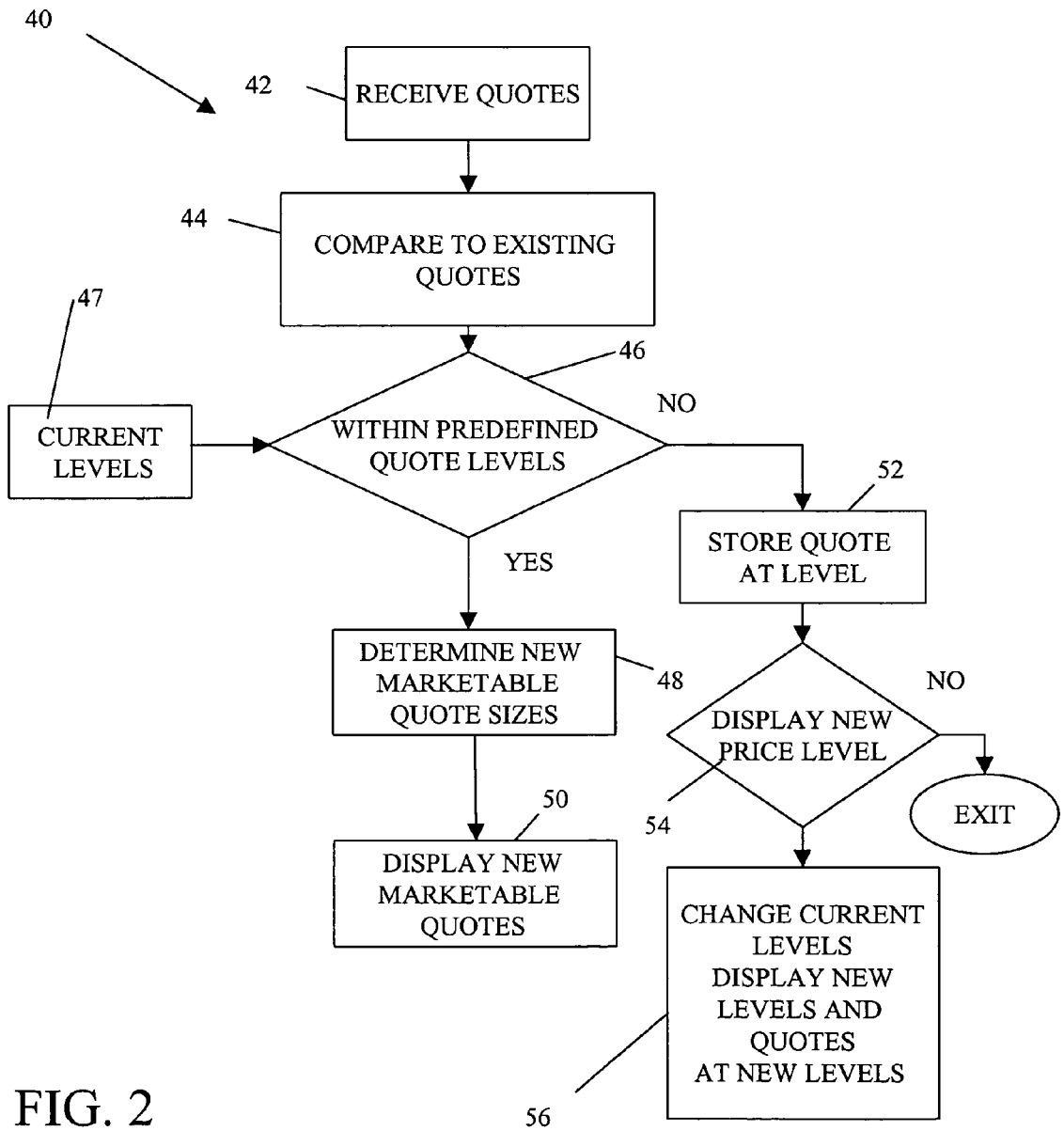
FIG. 2 is a flow chart showing an order receipt process in the market of FIG. 1.

Referring now to FIG. 2, the order display and execution process 40 receives 42 quotes from the various sources mentioned above, i.e., market makers, ECN's and other markets/exchanges. The order entry process 40 compares 44 the received quotes to existing quotes to determine 46 whether the quotes correspond to current pre-defined quote levels 47 which, for this example, will correspond to one of three price levels that are subject to automatic execution. If the quote is within one of the current quote levels 47, the process 40 determines 48 new marketable quote sizes by adding the quote size corresponding to the received quote, to quote sizes at that price level already in the market system 20. The process 40 will display 50 the new marketable quote sizes. The order display and execution process 40 is an ongoing process that continually receives quotes and adjusts displayable price levels based upon new prices received in the quotes. If a received quote does not have a price that corresponds to an existing price level, the process 40 will store 52 the quote at a new price level and will determine 54 whether a new price level should be displayed. If a new price level should be displayed, the process 40 will change 56 current price levels and display quotes at the new current price levels.

Figure 3A:
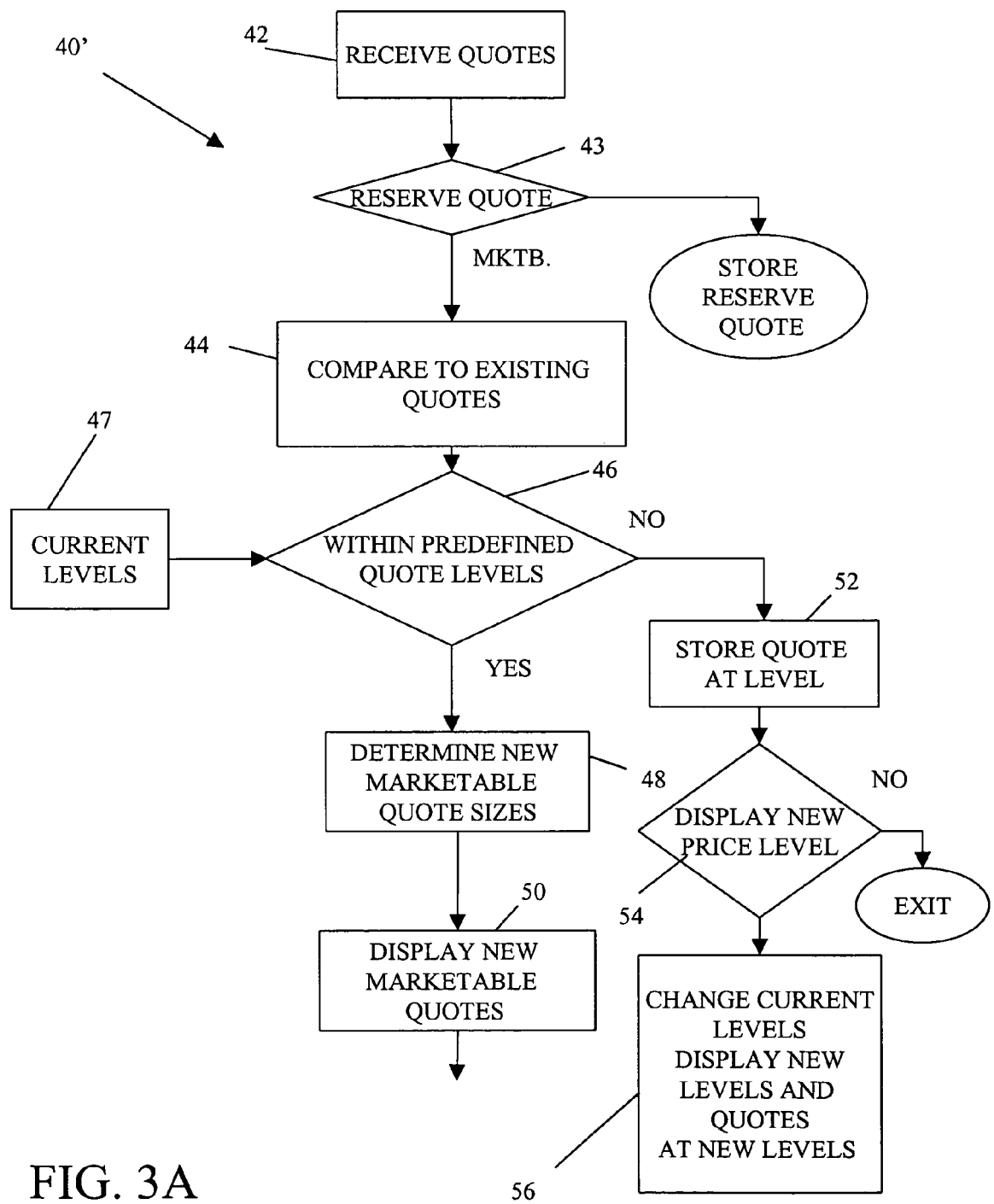
FIGS. 3A-3B are flow charts showing an alternative order receipt process for the market of FIG. 1.

Referring now to FIG. 3A, an alternative order entry process 40' is shown. The order entry process 40' receives 42 quotes from the various sources mentioned above. The order entry process 40' determines 43 whether the received quote corresponds to a reserve quote. If the quote does not correspond to a reserve quote then the quote is either a marketable quote or an additional aggregate quote. The order entry process 40' compares 44 the received quotes to existing quotes to determine 46 whether the quotes correspond to pre-defined quote levels which, for this example, will correspond to one of three price levels that are displayable. If the quote falls in a displayable price level it is a displayable quote eligible for automatic execution. The electronic market system 20 can accommodate more price level depth than the three levels, e.g., a depth of 20-25 levels or more. To facilitate trading a limited number, e.g., three would be displayed at any one time.

If the quote is within one of the pre-defined quote levels, the process 40' determines 48 new marketable quote sizes by adding the quote size corresponding to the received quote to quote sizes at that price level already in the market system 20. The process 40' will cause the new marketable quote sizes to be displayed 50.

Figure 3B:
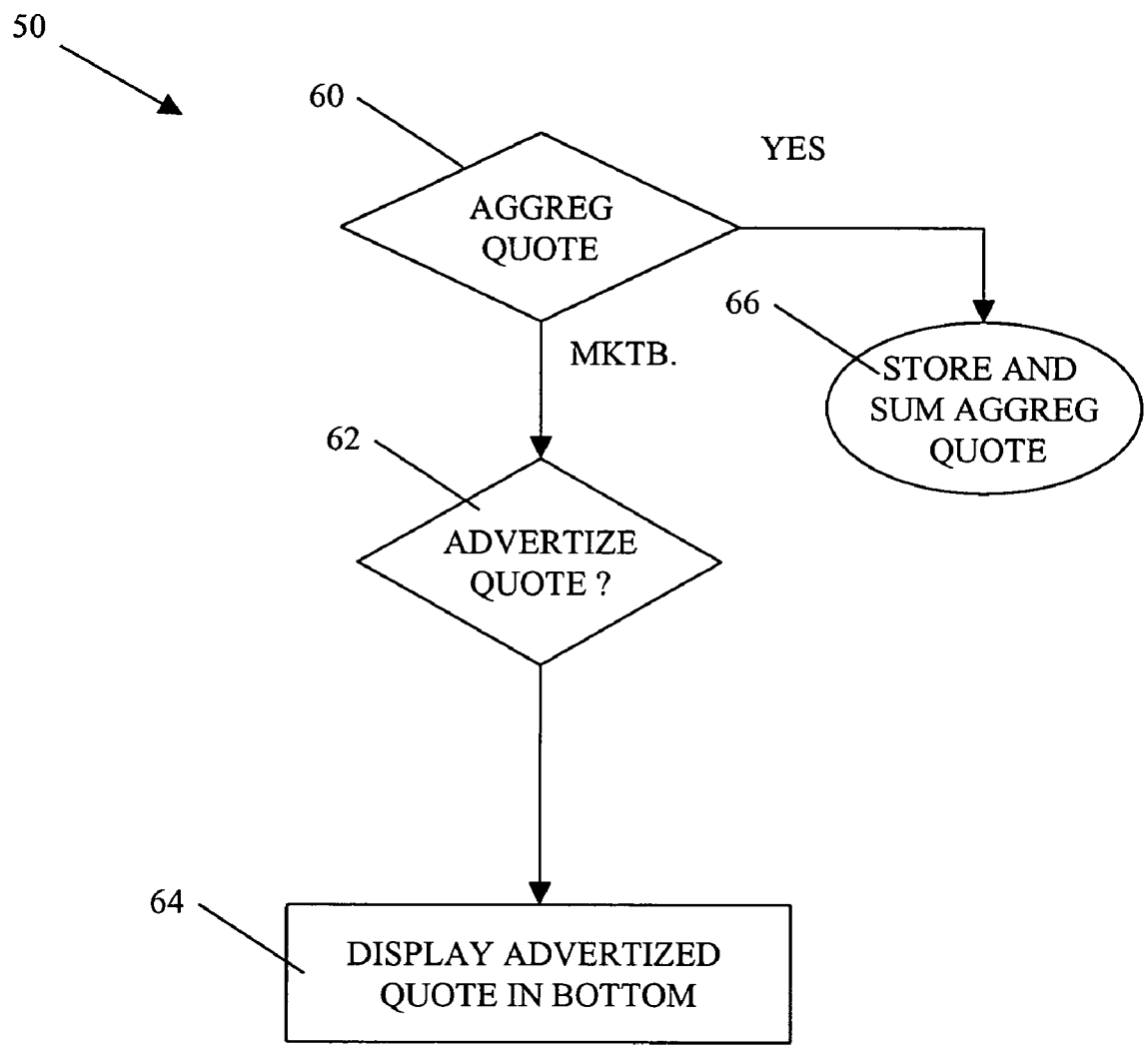

Referring to FIG. 3B, the process 50 to display the marketable quote will determine 60 whether the quote is an additional aggregate quote or a displayable marketable quote. If it is a displayable marketable quote 62, the quote will be displayed 64 in the advertising or current quote portion 74 at the bottom of the window 70. Otherwise, the quote will be considered to be an additional aggregate quote. The additional aggregate quote is added 66 to existing marketable quotes i.e., additional aggregate quotes and displayable quotes. The additional aggregate is also added to existing aggregate quotes for the particular entity that entered the quote. The additional aggregate quote is not attributed to the entity that entered it. However, the system causes the quote to be displayed in the aggregate portion 72 of the window 70.

This process 40' is also an ongoing process that continually receives quotes and adjusts the price levels based upon new prices of quotes. If a received quote does not correspond to a predefined quote level, the process will store 52 the quote at the new level and will determine 54 whether a new level of prices should be displayed. If a new price level should be displayed, the process 40 will change current price levels and display quotes at the new current price levels.

If the process has determined 43 that the quote was a reserved quote, the process will store and sum 67 that quote in a reserved quote for the particular entity that entered the reserved quote.

Figure 4:
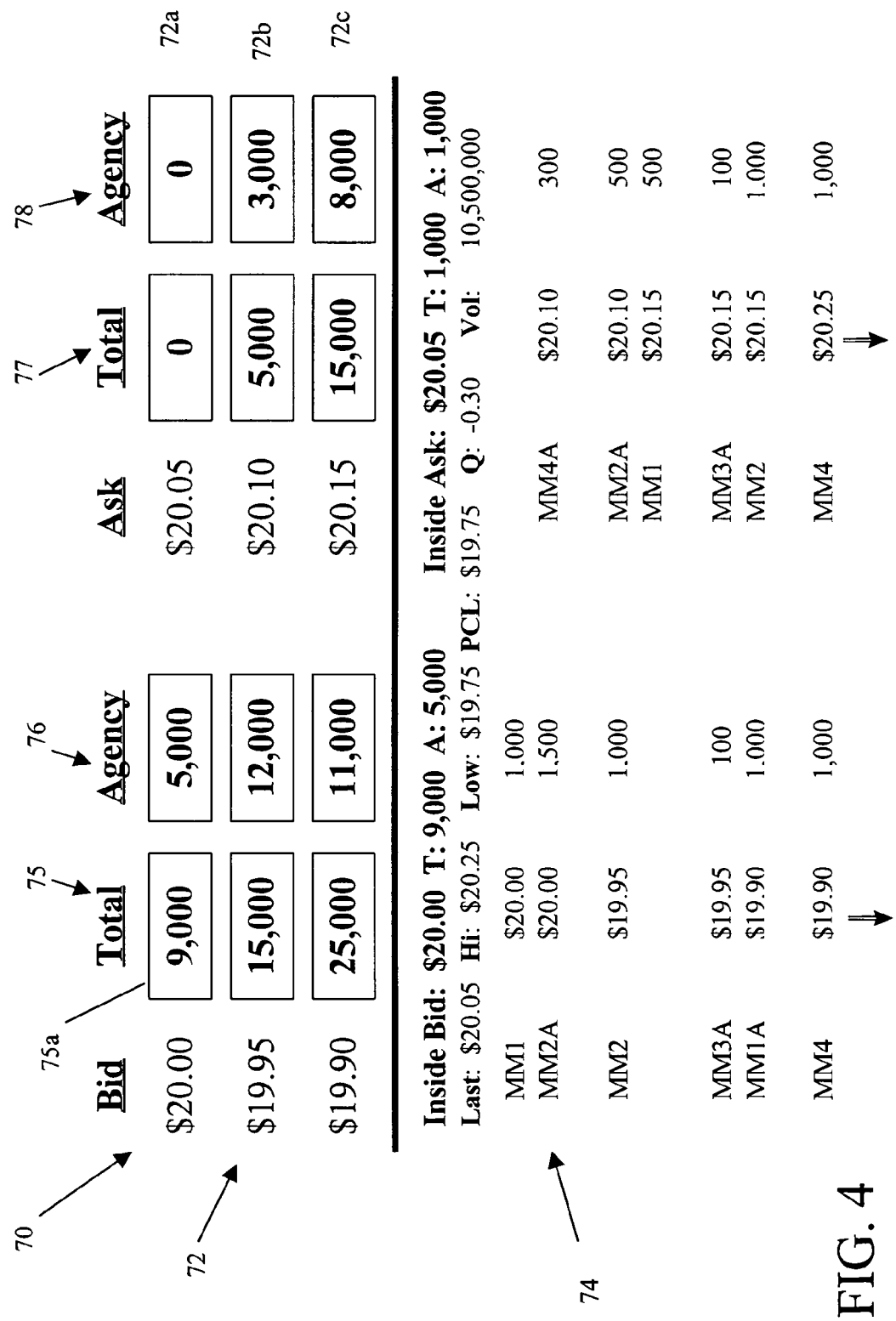
FIGS. 4-6 are diagrams of order entry graphical user interfaces.

Referring now to FIG. 4, an order display graphical user interface (GUI) 70 is shown. In this embodiment, the order display GUI 70 includes two regions. A first region 72 displays aggregated bids and offers and includes a first line 72*a* to display the price levels for best bid and best offer along with quote sizes. The quotes sizes are the total aggregate number of displayable shares 75, 77 and aggregate agency shares 76, 78. These quotes are subject to automatic execution for both sides (bid and offer) of the inside market. The top-half 72 of the window 74 also includes lines 72*b* and 72*c* that display the same information for the next two best bids and best offers, (i.e., next two ticks) regardless of their price distance from the inside quote. In this embodiment, the window 70 includes separate fields that specify the number of agency shares at each price level. Aggregating the agency interest and displaying agency interest separately is optional. Aggregating agency interest can be considered as exposing natural interest i.e., from participants other than market maker professionals, prior to accessing proprietary quotes.

The current quote montage 74 of the window 70 displays market-maker and ECN quotes (both price and quote size) for the purpose of advertisement to the marketplace. The current quote montage 74 of the window 70 also includes information pertaining to the inside bid and ask price with the aggregated total and agency amounts at that price, as well as information concerning the last trade, the high for the day, low for the day, previous close (PCL), change in quote (Q) and volume. In the window 70 proprietary quotes of market makers are denoted as MM1, MM2, and so forth, whereas agency quotes are identified as MM2A i.e., an agency quote sponsored by MM2 and so forth. The current quote montage 74 of the window 70 without agency quotes is similar to the long existing Nasdaq Workstation II® display montage, whereas the current quote montage 74 with the agency quotes as depicted is similar to that shown in U.S. patent application Ser. No. 09/208,942, filed on Dec. 12, 1998 entitled "DUAL QUOTE MARKET SYSTEM" by Richard G. Ketchum et al. and assigned in part to the assignee of the present invention.

The advertisement of individual interest to the marketplace offers a starting point for arriving at a negotiated price with another market participant. Each market maker may have a proprietary and/or agency interest that is displayed under the limit order display rule. All quotes in the current quote montage of the window 70 are also included in the aggregate in the top-half if they are within the necessary distance from the inside market and are subject to automatic execution.

Under current order handling rules, market makers would be required to advertise both their best proprietary bid and offer and their best agency bid and offer in the current quote montage of the window 70. Alternatively, subject to regulatory approval, the top-half of the window 70 could be considered as an alternative to the Order Handling Rules so that a market maker would not be forced to advertise an agency quote in the current quote montage 74 of the window 70. One advantage of this system is a significant decrease in the number of quotes in the current quote montage 74 and quote updates required to be broadcast over the market e.g., Nasdaq network. Another alternative could allow market makers to advertise a proprietary quote that is at an inferior price to their best proprietary quote in the system. For example, a market maker's best proprietary bid in the window 70 may be for 1,000 shares at $20, yet the market maker may have a business reason to advertise 10,000 shares at $19½.

Figure 5:
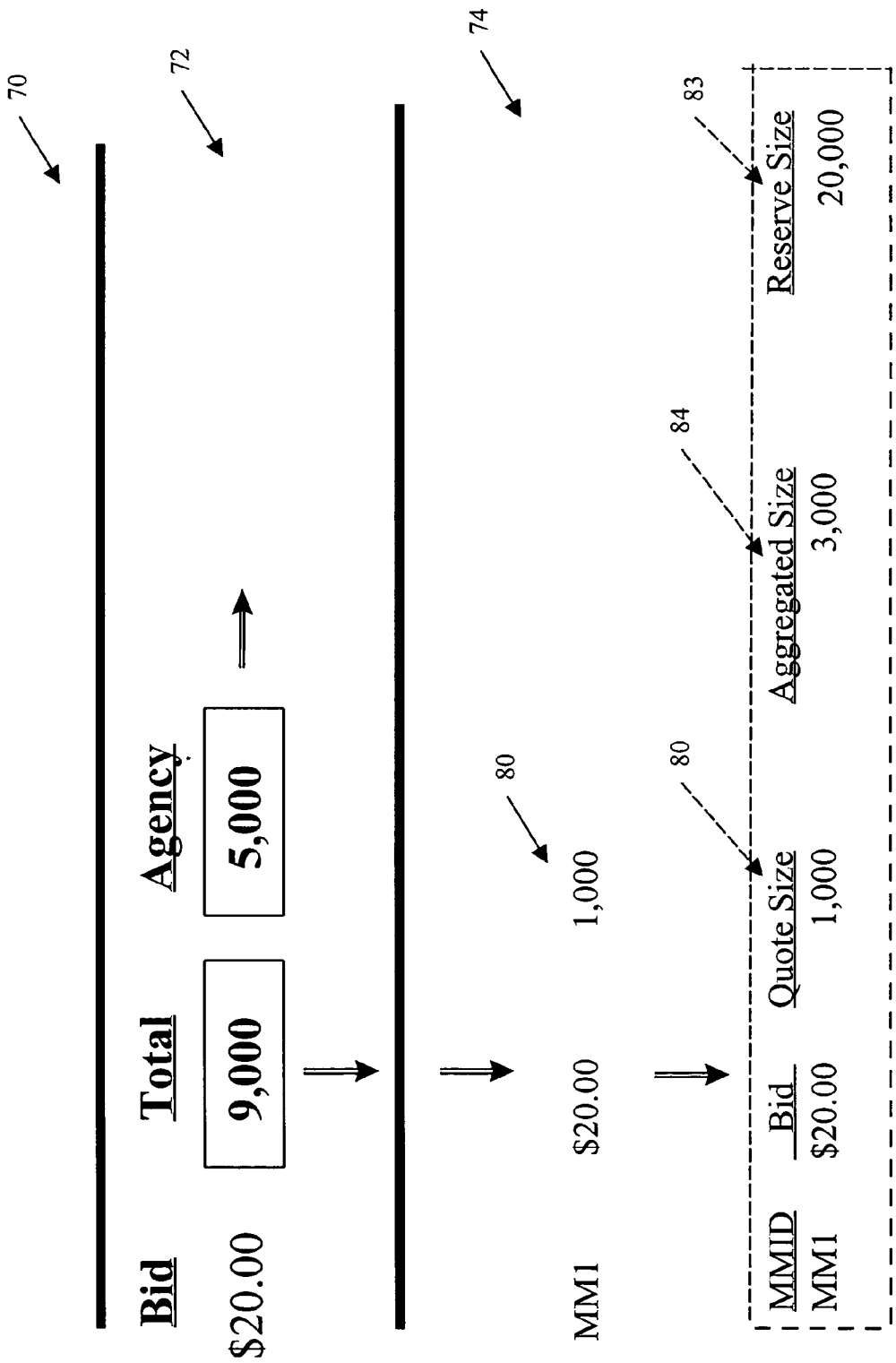

Referring to FIG. 5, an example to explain the various types of quotes is shown. Currently, in electronic markets such as The Nasdaq Stock Market, the market can handle a quote size 80. The reserve size 82 is not displayed to the market, but is executable if an order comes in. The market system 20 provides for a third type of quote. In FIG. 5, the quotes in the phantom box 85 are meant to illustrate the quotes that can exist in the system. Only the quote size 80 as mentioned above is displayed. The other quotes shown in the phantom box 85, the reserve size 82 and the additional aggregate size quote 84, are not displayed.

As shown in FIG. 5, in time priority (described below) a market maker (MM1) can have an advertized bid at $20.00 and a quote size of 1,000. Market maker MM2 can have an agency quote MM2A at $20.00 for 1,500 shares. MM1 can have a reserve size quote 82 of 20,000, as shown in phantom in FIG. 5 (not displayed to the market but existing in the market system 20), and an aggregate quote size 84 of 3,000 (displayable to the market in the aggregate display 72 but not attributable to MM1. If a participant enters an order for 9900 shares in time priority (described below), e.g., 1,000 will be executed against MM1's quote size 80 since it was first posted. The balance of 8,900 will be executed from aggregate quote size 84 and the reserved quote size 82. Thus, 3,000 will be executed from the aggregate quote 84 and the balance of 6900 from reserve quote 82. Thus, quote size is what a market maker desires to advertise to the market, while additional aggregate size is what the market maker is willing to advertise to the marketplace but in a manner that is not attributable to the market maker. Additional aggregate size is included in the total aggregate quotes 75 in the upper portion 72 of the window 70, but is not attributed to any market participant. Reserve size is never displayed or made known to the market. Reserved size exists but is not included in the aggregate quote sizes.

Virtual Price Improvement

Figure 6:
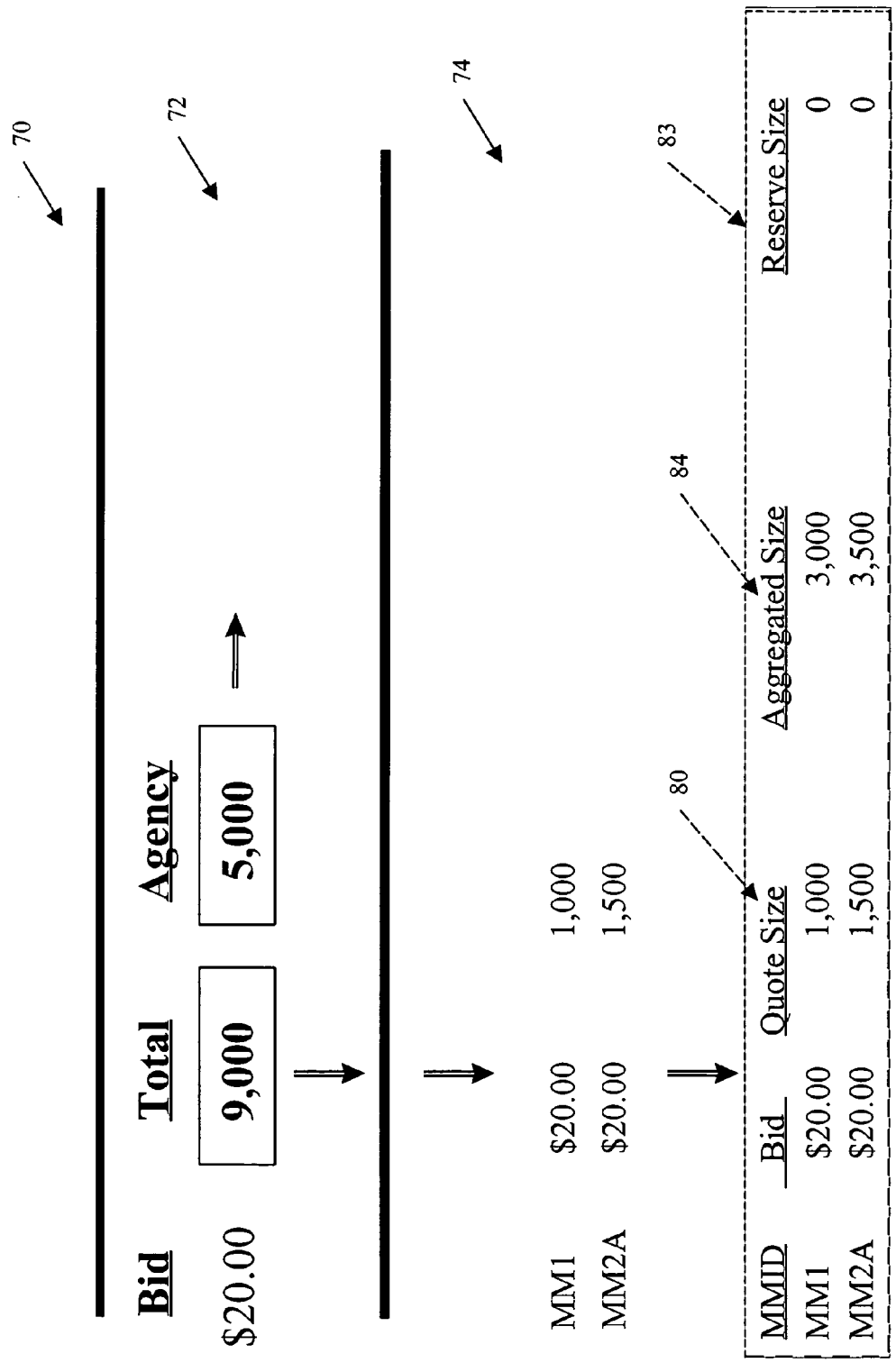

Referring now to FIG. 6, for the price level of $20 there is a total bid quote of 9,000 and a total agency quote of 5,000. In the current quote montage 74 of the window 70 market maker MM1 is bidding at the $20 price level 1,000 shares and market maker MM2 has an agency quote for 1,500 at the $20 price level. Their total quote size is 2,500. If MM1 and MM2A are the only $20 bids in the system, it can be deduced that MM2A must have 3500 shares of additional aggregate size since MM2A is the only agency quote at $20 and has a quote size of 1,500. Since there is 5,000 shown in agency aggregate shares, MM2A must have 3,500 shares of additional aggregate size. Market maker MM1, therefore, has 3,000 in aggregate size. Therefore, market makers have 6,500 shares in aggregate size. If a market participant clicks on the 9,000 button and actually wants to sell 9900 shares, the system gives price-time priority in executing the order. Thus, the system will execute the 1,000 shares from MM1 quote size, 1500 from MM2A quote size, 3,000 from MM1 aggregate quote, and 3500 from MM2 aggregate quote, leaving a balance of 900 from the order.

The market system 20 includes an interval delay between jumping to new price levels. The system will delay for e.g., 5-10 seconds before executing the balance of the order at the next price level e.g., $19.95. During that time MM1 and MM2A have an opportunity to take the balance of the order at $20. The market system 20 can be designed to ask only one of the market participants to take the balance or it can determine a time priority to see if either one desires to take the balance. One of those entities may take the 900 shares at 5 cents more, giving the participant who submitted the order a virtual price improvement. The quote process (not shown) immediately updates the inside bid quote to 19.95 while the ask quote remains 20.05. The 10 second delay is a delay in the execution system for that one order. Since there might be a queue of sell orders, the market system 20 is delayed so all orders are delayed for execution.

As mentioned above, the collection of pre-trade information, defined as nonmarketable indications of interest in the form of quotes or orders, are limited to registered market makers and ECNs. For any given security, e.g., stock, a registered market maker or ECN may directly enter a nonmarketable order into the order window 70 on behalf of a customer or may sponsor the direct entry of an order by its customer. These sponsored, nonmarketable orders are sent to the market system 20 under the name of the sponsoring market maker or ECN. Each market maker or ECN can submit an unlimited number of nonmarketable quotes to the market system 20. For example, a market maker can submit its entire customer book to buy a stock to the system. This book may have nonmarketable quotes at various price levels. In addition, market makers are permitted to submit both proprietary and agency quotes, whereas, registered ECNs are only permitted to submit agency quotes. Registered market makers would be required to submit at least one proprietary bid and offer, whereas, ECNs have no quote requirement.

As an example, Market maker 1 MM1 submits to the system 10 six, (6) proprietary bids and agency bids. MM1 can have proprietary bid quotes at 20 for 1,000 shares, 19⅞ for 1,000 shares and 19¾, for 1,000 shares. MM1 can have an internal book filled with customer orders, at three bid price levels, e.g., 20⅛ for 100 shares, 20 for 200 shares, 19¾ for 200 shares. The market marker chooses one of those six bids to advertise. Not every quote is shown in the current quote montage 74. In this example, MM1 can choose to advertise the 19¾ quote. Even though the market participants next proprietary bid will be displayed above, it should be advertised below. If MM1 chooses to advertise the quote for 19¾ bid and it turns out that 19¾ is within the three displayable levels in portion 72, then the advertized quote will also be included in the aggregate 75a.

Figure 7:
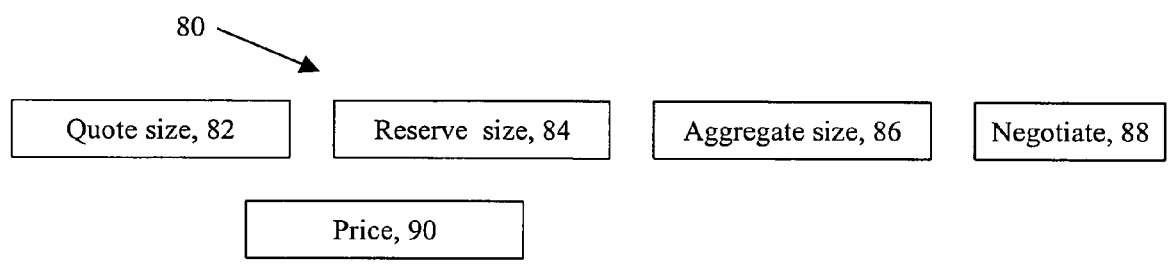
FIG. 7 is a diagram of an entry format for quotes.

Referring to FIG. 7, a format for quotes 80 submitted to the market system 20 include a quote size 82, an additional aggregate size 86, and a reserve size 84. In addition, the quotes can include an indication of a willingness to further negotiate 88. This could be a simple window-type i.e., point and click interface where each of these fields can be controls that allow a quoting market participant to enter size and price 90 for quotes at each side of the market. Quote size is the size that is directly attributable to the market maker or ECN when displayed in the current quote montage 74 of the window 70. The current quote montage allows participants to advertise their quotes in an attributable manner to the market. The additional aggregate size is the size in addition to quote size that a market maker or ECN wishes to display to the marketplace through the aggregate display in the upper portion 72 of the window 70, but for which the market maker desires to have it remain anonymous until executed. The aggregate size is likewise stored in the market system 20 and is displayed to the marketplace as part of the aggregate display, but is not attributable to the market maker or ECN that entered the additional aggregate size. Reserve size is the size that is not displayed to the marketplace, but is immediately accessible through the market system 20. The reserve size is stored in the market system 20 but is not displayed to the marketplace. A willingness to negotiate further can be expressed as a "yes" or "no" or can be inferred by being displayed in the current quote montage 74 of the window 70. A quote in the current quote montage 74 of window 70 requires an order to be delivered for negotiation before moving onto a next price level. The process 40 aggregates only those quotes and orders that are subject to automatic execution. The process 40 aggregates every order and quote it receives at a given price level for a given stock that is accessible by automatic execution. Quote size and additional aggregate size are aggregated together for display, whereas, reserve size is available liquidity accessible through the market system at any given price level but is not displayed. The quotes are accessible by automatic execution and price/time priority. The process 40 separately aggregates agency interest to buy and sell. The process 40 can also separately calculate agency aggregate quotes.

As mentioned above, all market makers can execute against the pre-trade information collected in the window 70 by entering a market or marketable limit order. Market and marketable limit orders can be entered either into the top-half 72 of the window 70 to access the aggregate liquidity available or directed to an individual market maker or ECN in the current quote montage 74 of the window 70.

The market system 20 can use "point-and-click" window-type technology so that market participants can enter marketable orders by simply clicking on quotes in the window 70. For example, each of the entries in the window 70 can be a control button so that a simple click on the control, e.g, the aggregate shares displayed 75a (FIG. 4) can activate an execution. The click with a mouse or the like at the inside bid in the top-half of the window 70 would enter a "default" order priced at the displayed price for the displayed shares. The system would allow a trader to set a "default" number of shares, e.g., 1000 shares. For example, whenever trader clicked on the aggregate shares displayed at the inside bid the trader's system 12 would generate an order for 1,000 shares at the inside price. In addition, a "right-click" on the aggregate display would permit a trader to customize the order at the point of entry.

A market or marketable limit order entered into the aggregate montage 72 of window 70 will be handled in full, one at a time, in the order received. Each marketable order would interact with non-marketable quotes and orders in price/time priority. First, a marketable order would interact with all quote size at a given price, in time priority. The marketable order interacts with all additional aggregate size quotes at a given price in time priority. Finally, an order would interact with all reserve size at a given price level in time priority. Because quote size and additional aggregate size is refreshed, a delay e.g., 15 seconds, may be introduced to preserve time priority once quote sizes have been refreshed.

Once all quote sizes at a given price level have been executed, and before a marketable order is executed at the next available price level, there will be some delay, e.g., 15 seconds. During this period the window 70 is updated to reflect a new inside market (i.e., best bid and best offer). At the same time, the execution system delivers the remainder of an order or the next marketable order in a queue to the market maker with highest time priority who has also expressed a willingness to negotiate with an order. This is an important attribute, because market participants may internalize order flow based on the displayed Best Bid Offer (BBO) and any delay in updating the BBO will force them to execute on a fictional BBO. The BBO is a standardized quote in the securities industry for the national market systems best consolidated quotation, e.g., the best available price to buy and sell.

The market maker who is delivered the order can have three options. The market maker can decline the order, in which case the order would be routed (at the end of the delay period) to market participants bidding at the next highest level. By bypassing the other willing-to-negotiate market makers, this minimizes potential delays in the system and increases the value of time priority. Alternatively, the market maker could fully or partially execute the order at the previous inside price (if it is partially executed, the balance of the order is routed to market participants bidding at the next highest level as above). With another alternative, the market maker could execute the balance of the order at a negotiated price.

Market participants can direct orders to a particular market maker or ECN through accessing the current quote montage 74 of the window 70. Directed orders will not be subject to automatic execution, but rather delivered to a quoting market participant for execution. The quoting participant will have the option of executing, rejecting, or negotiating with the order, as is commonly done now in the existing Nasdaq market.

Those participants whose quotes are subject to automatic execution and thus included in the aggregate display in the top-half of the window 70 will not be subject to liability orders through the current quote montage 74. Instead, a market participant will be obligated to send to a quoting participant who is subject to automatic execution an order for a minimum acceptable quantity, e.g., at least 100 shares greater than the quoting participant's Quote Size. A simple click on a quoting participants quote will send this type of order as the default, although a market participant could right click on the quoting participants quote in the bottom half of the window 70 and customize the order at the point of entry.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example the market process can be used with other products such as goods, commodities, works of art, etc.

What is claimed is:

1. A method, executed in a computer server system of an electronic market system for trading of securities, for managing quotes for a security, the method comprising:

receiving by the server computer system from client systems used by market participants, quotes, the quotes including fields to indicate whether the quote is to bid or offer a security, a first size value that indicates a displayable, attributable size amount of the quote and a second size value that indicates an additional quote size that is displayable on displays of client systems, as trading interest in a security, but not attributable to any market participant, and the server computer system calculating and causing a total size of all aggregated quotes to be displayed for each of a plurality of price levels on the client systems.

2. The method of claim 1 further comprises:
calculating by the server computer system, a total size of quotes at a particular price level, by:
determining a total displayable, non-attributable size of the quotes received from client systems displayable quotes; and
sending a message to cause user interfaces to be rendered on displays of client systems, with the portion of the received quotes having the first size value as attributable size amounts displayed as quotes attributable to the market participants.

3. The method of claim 2 further comprising:
sending by the server computer system, a message to display the total displayable, non-attributable quote sizes as displayable quotes without displaying identifications of the market participants from which the non-attributable quote sizes were received.

4. The method of claim 3 wherein calculating total quote size comprises:
determining, by the server computer system, the total quote sizes by adding the first and second size values for the received quotes at each of a plurality of corresponding price levels to provide the total displayable quote sizes for each of the corresponding price levels;
causing displays of client systems to render in a user interface the total of displayable quote sizes in a first region as separate entries for both bid and offer for each of a plurality of different price levels provided in a quote montage.

5. The method of claim 4 further comprising;
causing displays of client systems to render the attributable quotes as individual lines in a current quote window with market participant identifiers adjacent the quotes to attribute the quotes; and
causing the displays of client systems to render the displayable, non-attributable size of the quotes as single entry for each of the price levels.

6. The method of claim 4 wherein executing further comprises:
receiving, by the server computer system, an order produced when a user selects in one of the user interfaces one of the separate entries at one of the price levels; and
executing, by the server computer system, the order against quotes corresponding to the one of the separate entries in the user interface.

7. The method of claim 3 wherein determining total aggregate quote size for quotes received for the security, comprises:
adding, by the server computer system, liked-priced quotes of the displayable and additional aggregate quote type together to provide a total aggregate quote.

8. The method of claim 2 further comprising:
determining, by the server computer system, if the additional aggregate quotes and displayable quotes are proprietary or agency quotes;
determining, by the server computer system, a total of all agency quotes and proprietary quotes; and
causing displays of client systems to render a total of all agency quotes and to render in a separate area of a montage a total of all displayable quotes as the total of agency quotes and proprietary quotes.

9. The method of claim 2 further comprising:
receiving, by the server computer system, an order produced when a user selects in the user interface one of the received quotes with the first size value; and
executing, by the server computer system, the order against a quote stored in the server computer system with the order executed against the quote.

10. The method of claim 1 further comprises:
receiving, by the server computer system, quotes from client systems that are reserve quotes, which are neither displayable quotes nor attributable to market participants, but are available as trading liquidity in the security.

11. The method of claim 1 further comprising:
determining, by the server computer system, if the quote only has a displayable attributable or displayable non-attributable quote size;
adding, by the server computer system, the size of quote to corresponding sizes of other quotes at corresponding price levels;
causing displays of client systems to render in a first portion of a quote montage, the quote, if the quote is displayable, and attributable, and in a different portion of the montage a total displayable quote size.

12. The method of claim 1 further comprising;
receiving, by the server computer system, a reserve quote.

13. An electronic market system for trading of securities in association with a plurality of client systems for entering quotes, the quotes including fields to indicate whether the quote is to bid or offer a security, a first size value that indicates a displayable, attributable size amount of the quote and a second size value, with the first size values of quotes being quotes that are displayable and attributable to a specific market participant, and the second size values being quotes that are displayable but not attributable to a specific market participant, the electronic market system comprising:
a server computer;
the sever computer configured to:
receive the quotes from the client system;
calculate and cause a total size of all aggregated quotes to be displayed on the client system for each of a plurality of price levels; and
cause quotes having a first size value to be displayed on displays of the client systems as individual quotes with the first size value for each quote with a market participant identifier on the client systems.

14. The electronic market system of claim 13 wherein at client systems quotes further comprise a reserve quote size that are reserve quotes that are neither displayable nor attributable to a specific market participant.

15. The electronic market system of claim 13 wherein the user interface includes a montage for displaying second size values of quotes at multiple price levels on either side of the market.

16. The electronic market system of claim 15 wherein the server computer system is configured to cause totals of the first and second size values for quotes to be displayed on the displays in a graphical user interface comprising fields for proprietary interest and agency interest according to the type of quote.

17. The electronic market system of claim 13 wherein the server is configured to cause the displays to render a graphical user interface that includes a current quote montage disposed adjacent to a montage to display second size values.

18. A client system for entering quotes for securities, the client station comprising:
- a display configured to render a graphical user interface at which quotes can be entered at a price level, said graphical user interface comprising fields to enter a quote having a first size value that indicates a displayable, attributable size amount of the quote displayable and attributable to a specific market participant, and a second field for entering a second size value that indicates an additional quote size that is displayable but not attributable to a specific market participant, and
- a computer configured to display a total size of all aggregated quotes for each of a plurality of price levels.

19. The system of claim 18 wherein the graphical user interface comprises a third field for entering a third size value that indicates a reserve quote being neither displayable nor attributable to a specific market participant.

20. A computer program product for rendering a graphical user interface for an electronic market system for trading products, the computer program product tangibly embodied on a non-transitory, computer-readable storage device and storing instructions which when executed by a processor cause the processor to:
- render the graphical user interface having a first portion that displays size values of additional quotes for a plurality of price levels of a product traded in the market, the additional quotes including size values of quotes that are attributable to market participants and size values of quotes that are displayable quotes but are not attributable to any market participants, and
- display on a client system a total size of all aggregated quotes for each of a plurality of price levels.

21. The computer program product of claim 20 further comprising instructions to:
- render a current quote portion disposed adjacent the first portion of the graphical user interface.

22. The computer program product of claim 21 wherein computer program product further comprises instructions to:
- cause the current quote window to display displayable quotes of participants in the system.

23. The computer program product of claim 21 further comprising instructions to:
- render the graphical user interface with the current quote window listing the displayable, attributable quotes ordered according to price as a list of bid quotes and a separate list of offer quotes disposed adjacent the first portion of the graphical user interface.

\* \* \* \* \*